(No Model.)
E. HÄNISCH & M. SCHROEDER.
PROCESS OF OBTAINING SULPHUROUS ACID.
No. 376,883. Patented Jan. 24, 1888.
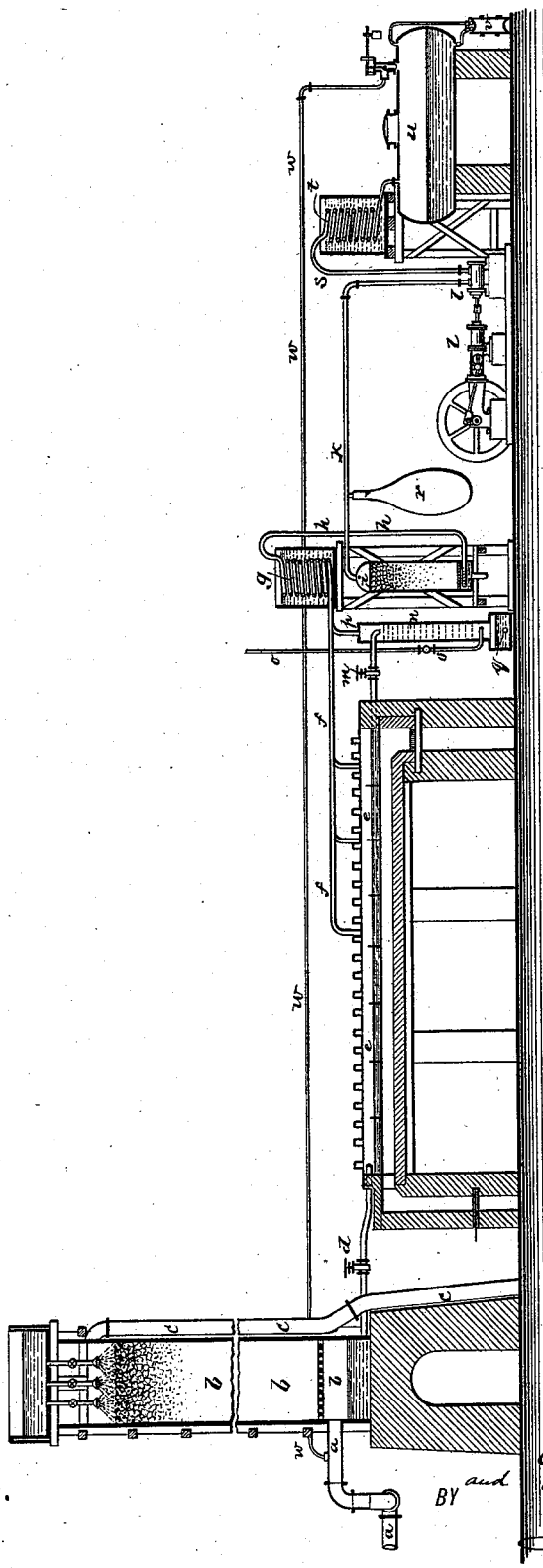
WITNESSES:
INVENTORS
Emil Hänisch
Max Schroeder
BY
ATTORNEYS.

UNITED STATES PATENT OFFICE.

EMIL HÄNISCH AND MAX SCHROEDER, OF HAMBORN, PRUSSIA, GERMANY.

PROCESS OF OBTAINING SULPHUROUS ACID.

SPECIFICATION forming part of Letters Patent No. 376,883, dated January 24, 1888.

Application filed June 4, 1885. Serial No. 167,663. (No specimens.)

*To all whom it may concern:*

Be it known that we, EMIL HÄNISCH and MAX SCHROEDER, subjects of the King of Prussia, residing at the village of Hamborn, in the Kingdom of Prussia, German Empire, have invented a new and useful Improved Process for Obtaining Liquid Anhydrous Sulphurous Acid, of which the following is a specification.

Our invention relates to a process for obtaining liquid anhydrous sulphurous acid from furnace-gases or similarly-composed gaseous mixtures.

We carry out our invention in the following manner, by the aid of the apparatus shown in the accompanying drawing, representing a longitudinal elevation, in section.

The gaseous mixtures employed by us contain, like the gases of combustion of sulphur in the air, or the calcination or roasting gases of pyrites, zinc-blende, and other sulphurous minerals, only a small percentage of sulphurous acid, and are chiefly composed of other gases. The furnace, calcination, or roasting gases are caused to pass through the pipe $a$ into the lower part of the absorbing-tower $b$, which is charged with coke or other suitable material, and in which a shower of cold water is kept continuously falling. This falling water thoroughly absorbs the sulphurous acid of the aforesaid gases. The unabsorbed gases, which in general consist of nitrogen and oxygen, are carried off from the upper part of the tower $b$ through the pipe $c$. The watery $SO^2$ solutions (anhydrous sulphurous-acid solutions) flow continuously through the pipe $d$ into a series of closed lead pans, $e$, in which, during their passage through the same, they are heated to nearly boiling-heat. The $SO^2$ gases which are evolved in the pans pass through the outlet-pipe $f$ into the cooling-worm $g$, which is surrounded with cold water. Thence they pass through the pipe $h$ into the vessel $i$, which is charged with pieces of chloride of calcium, or is sprinkled with sulphuric acid, in order to eliminate the particles of water still contained in them. From the vessel $i$ the gases pass to the compressing-pump $l$. The watery contents which have flowed through the series of pans $e$ still contain a certain quantity of sulphurous acid and are subjected to further treatment. They are conducted from the series of pans through the pipe $m$ to the vessel $n$, in which are arranged lead-wire nets or strainers. Here they receive the form of fine rain, in an opposite direction to the flow of which a stream of water-steam is at the same time conducted. The water-steam is supplied through the pipe $o$. The $SO^2$ gases which are evolved in the vessel $n$ are carried off through the pipe $p$, which latter communicates with the pipe $f$, and take their part in the process performed in the worm $g$ and vessel $i$. The water condensed in $g$ flows back through the pipe $p$ into the vessel $n$, and is discharged with the boiled-out waters through a pipe, $q$, provided at the bottom of the vessel $n$.

In order to regulate the pressure within the apparatus, the taffeta bag $r$ is employed. It is connected to the pipe $k$ and receives the excess gases, the motion of the compressing-pump $l$ being governed according to its dimensions. The gases compressed in the pump $l$ pass through the pipe $s$ to the cooling-worm $t$, and there become liquid. From the cooling-worm $t$ the said liquid flows into the vessel $u$, whence it is drawn off into containers, such as $v$, for sending away.

In order to be able to occasionally blow off the permanent gases, (oxygen and nitrogen,) provision is made of the pipe $w$, which is in communication with the vessel $u$ through a valve, by which means the said permanent gases are conducted into the absorbing-tower $b$.

What we claim as our invention, and desire to secure by Letters Patent, is—

The process herein described of producing liquid sulphurous acid from furnace or other gases containing sulphurous acid, which consists of the following successive steps: first, passing the furnace or other gases through a spray of water for separating the sulphurous-acid gases by absorption; secondly, heating the resulting solution of sulphurous acid and water, so as to evaporate the sulphurous-acid gas therefrom; thirdly, cooling the separated gases, and, fourthly, converting the same into liquid form by compression and condensation, substantially as set forth.

In testimony whereof we sign this specification in the presence of two subscribing witnesses.

EMIL HÄNISCH.
MAX SCHROEDER.

Witnesses:
AUGUST GRILLO,
JULIUS GRILLO.